US009950465B2

(12) United States Patent
Linnell et al.

(10) Patent No.: US 9,950,465 B2
(45) Date of Patent: Apr. 24, 2018

(54) VOXEL 3D PRINTER

(71) Applicant: X Development LLC, Mountain View, CA (US)

(72) Inventors: Jeff Linnell, Woodside, CA (US); Brandon Kruysman, San Francisco, CA (US); Jonathan Proto, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/814,061

(22) Filed: Nov. 15, 2017

(65) Prior Publication Data

US 2018/0071982 A1 Mar. 15, 2018

Related U.S. Application Data

(63) Continuation of application No. 14/588,039, filed on Dec. 31, 2014, now Pat. No. 9,840,045.

(51) Int. Cl.
*B29C 67/00* (2017.01)
*B29C 64/245* (2017.01)
(Continued)

(52) U.S. Cl.
CPC .......... *B29C 64/245* (2017.08); *B29C 64/129* (2017.08); *B29C 64/20* (2017.08);
(Continued)

(58) Field of Classification Search
CPC ... B29C 64/129; B29C 64/245; B29C 64/277; B29C 64/286; B29C 64/386; B29C 64/393
See application file for complete search history.

(56) References Cited

U.S. PATENT DOCUMENTS 8,326,024 B2 12/2012 Shkolnik et al.
8,666,142 B2 3/2014 Shkolnik et al.
(Continued)

FOREIGN PATENT DOCUMENTS

DE 19957370 3/2002
EP 2218571 8/2010
(Continued)

OTHER PUBLICATIONS

International Preliminary Report on Patentability issued in International Application No. PCT/US2015/067386, dated Jul. 13, 2017, 11 pages.
(Continued)

*Primary Examiner* — Timothy Kennedy
(74) *Attorney, Agent, or Firm* — Fish & Richardson P.C.

(57) ABSTRACT

An example system includes: (i) a resin container defining a cavity; (ii) a plurality of rods extending from an inner base surface of the resin container and into the cavity; (iii) a plurality of light sources arranged to emit radiation into the plurality of rods, such that when the cavity contains liquid resin, radiation passing through a given one of the rods cures liquid resin that surrounds the given rod; and (iv) a control system configured to: (a) receive data specifying a three-dimensional structure; (b) determine a shape for a layer of a plurality of layers that collectively form the three-dimensional structure; and (c) determine one or more of the light sources that correspond to the shape of the layer; and (d) form the layer by operating the one or more determined light sources that correspond to the shape of the layer.

20 Claims, 10 Drawing Sheets

(51) Int. Cl.
    *B29C 64/386* (2017.01)
    *B29C 64/20* (2017.01)
    *B33Y 30/00* (2015.01)
    *B33Y 10/00* (2015.01)
    *B33Y 50/02* (2015.01)
    *B29C 64/129* (2017.01)
    *B29L 31/60* (2006.01)

(52) U.S. Cl.
    CPC ............ *B29C 64/386* (2017.08); *B33Y 10/00* (2014.12); *B33Y 30/00* (2014.12); *B33Y 50/02* (2014.12); *B29L 2031/608* (2013.01)

(56) References Cited

U.S. PATENT DOCUMENTS

| | | |
|---|---|---|
| 8,801,418 B2 | 8/2014 | El-Siblani et al. |
| 2014/0277661 A1 | 9/2014 | Amadio et al. |

FOREIGN PATENT DOCUMENTS

| | | |
|---|---|---|
| JP | S63312129 | 12/1988 |
| JP | H0433835 | 2/1992 |
| WO | WO 2011098609 | 8/2011 |

OTHER PUBLICATIONS

International Search Report and Written Opinion issued in International Application No. PCT/US2015/067386, dated Jul. 7, 2016, 13 pages.

VOXEL 3D PRINTER

CROSS-REFERENCE TO RELATED APPLICATIONS

This application is a continuation application of U.S. application Ser. No. 14/588,039, filed on Dec. 31, 2014, which is incorporated herein by reference.

BACKGROUND

Three-Dimensional ("3D") printing is an additive manufacturing process in which successive layers of material are laid down on top of each other to form a solid 3D object. Over time, various types of 3D printing process have been developed, including extrusion-based 3D printing (e.g., fused deposition modeling (FDM)), and processes based on light polymerization, such as stereolithography (SLA) and digital light processing (DLP), among others.

In stereolithography processes, a 3D structure is built up one layer at a time, with each layer being formed by exposing a photo-reactive resin to an ultraviolet (UV) light source that cures the resin. Note that stereolithography may also be referred to as optical fabrication, photo-solidification, and/or solid free-form fabrication and solid imaging.

More specifically, in a typical stereolithography process, a digital 3D model of an object is created by a user via the software interface of a 3D printing application. The 3D printing application then slices the 3D model with a set of horizontal planes. Each slice of the 3D model can then be converted to a two-dimensional mask image, such that the 3D model is represented as a sequence of two-dimensional mask images, which each outline the shape of the corresponding layer from the 3D model. The mask images sequentially projected onto a photo-curable liquid or powders resin surface while light is projected onto the resin to cure it in the shape of the layer. Alternatively, instead of using masks, each slice of the 3D model may be representing by a two-dimensional image in the shape of the slice, so that a projector can project a sequence of such two-dimensional images onto the resin surface to form an object corresponding to the digital 3D model.

SUMMARY

Example embodiments relate to three-dimensional (3D) printing systems and methods. 3D printing using stereolithography can be a time-consuming process. More specifically, in a typical stereolithography process, a considerable amount of time is spent directing a concentrated light source across along a path to cure each layer of a 3D object. Example embodiments may allow for more rapid curing of each layer of a 3D object by providing rods through which light is passed through to cure resin surrounding the luminous rods.

For instance, in an example embodiment, a 3D printer may use stereolithography to form each layer by selectively curing the specific voxels that form the layer's shape. To do so, the 3D printer may include multiple light sources, with each light source being arranged to project light through a corresponding rod that extends into a vat of curable liquid resin. The rods may be arranged in a grid such that light that is emitted from each rod can cure a voxel of a predetermined shape around the rod. Further, the grid of rods may be arranged such that neighboring rods will cure voxels that abut one another, so that the cured voxels connect and collectively form a layer. For instance, each rod may be configured to cure a hexagonal voxel, such that "honeycomb" layers of various shapes may be formed.

In one aspect, a system includes: (i) a resin container defining a cavity, wherein the cavity is defined in part by an inner base surface of the resin container; (ii) a plurality of rods extending from the inner base surface and into the cavity; (iii) a plurality of light sources arranged to emit radiation into the plurality of rods, such that when the cavity contains liquid resin, radiation passing through a given one of the rods cures liquid resin that surrounds the given rod; and (iv) a control system configured to: (a) receive data specifying a three-dimensional structure; (b) determine a first and a second shape for a first and a second layer, respectively, from a plurality of layers that collectively form the three-dimensional structure; (c) determine one or more of the light sources that correspond to the first shape; (d) form the first layer by operating the one or more determined light sources that correspond to the first shape to cure liquid resin in the first shape; (e) determine one or more of the light sources that correspond to the second shape; and (f) form the second layer onto a surface of the first layer by operating the one or more light sources that correspond to the second shape to cure liquid resin in the second shape.

In another aspect, a system includes: (i) a resin container defining a cavity, wherein the cavity is defined in part by an inner base surface of the resin container; (ii) a plurality of rods extending from a surface of the base plate and into the cavity; (iii) a plurality of light sources arranged to emit radiation into the plurality of rods, such that when the cavity contains liquid resin, radiation passing through a given one of the rods cures liquid resin that surrounds the given rod; (iv) a base plate suspended from above the resin container and configured to adhere to cured resin; and (v) a control system configured to: (a) receive data specifying a three-dimensional structure; (b) determine a first and a second shape for a first and a second layer, respectively, from a plurality of layers that collectively form the three-dimensional structure; (c) determine one or more of the light sources that correspond to the first shape; (d) form the first layer by operating the one or more determined light sources that correspond to the first shape to cure liquid resin in the first shape; (e) determine one or more of the light sources that correspond to the second shape; and (f) form the second layer onto a surface of the first layer by operating the one or more light sources that correspond to the second shape to cure liquid resin in the second shape.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
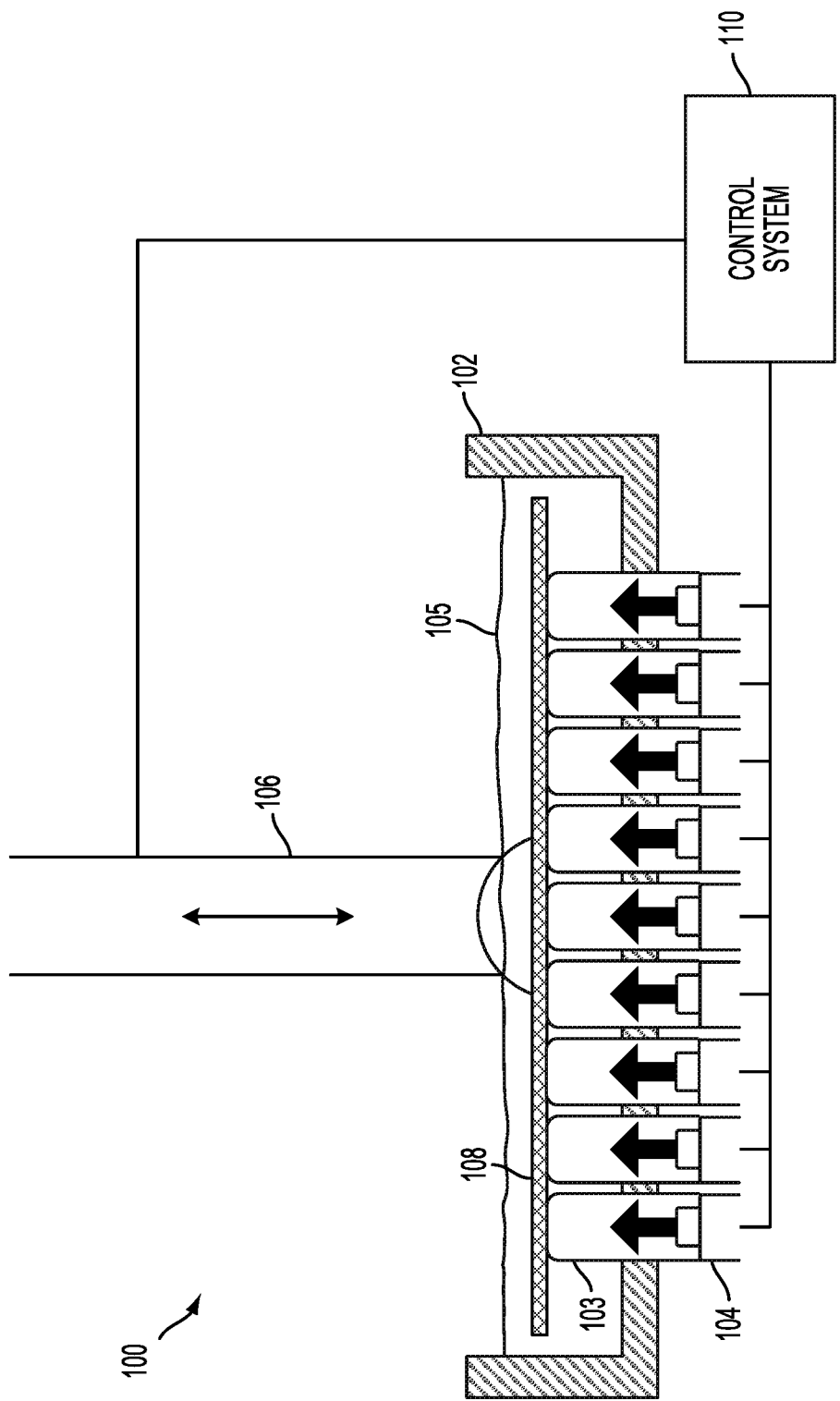
FIG. 1A shows a side view of a three-dimensional printer system, according to an example embodiment.

The following detailed description describes various features and functions of the disclosure with reference to the accompanying Figures. In the Figures, similar symbols typically identify similar components, unless context dictates otherwise. The illustrative apparatuses described herein are not meant to be limiting. It will be readily understood that certain aspects of the disclosure can be arranged and combined in a wide variety of different configurations, all of which are contemplated herein.

I. OVERVIEW

Example embodiments relate to three-dimensional printing systems and methods. In particular, an example 3D printer may include a robotic arm or another robotic device that suspends a base plate above a container filled with a photo-reactive resin. The container may include rods extending upwards from the base of the container. In some implementations, the rods are arranged adjacent to each other to form a grid or a lattice. Light sources operated by a control system may distribute electromagnetic radiation through the rods, which causes resin surrounding the rods to cure.

The control system may receive data that represents a 3D structure. The control system may divide the three-dimensional structure into layers, which when stacked, form the 3D structure. Each layer may then be divided into and/or approximated as voxels. A "voxel" may be understood as a three-dimensional space having a pre-defined shape and volume. As such, each layer may be formed from voxels that are within the same plane and collectively form the desired shape of that layer.

More specifically, to form an initial layer (e.g. a first layer) of a 3D object, the base plate of a 3D printer may be lowered into the resin, such that the base plate contacts the tops of the rods. The control system may then operate one or more ultraviolet (UV) light sources to emit radiation into their corresponding rods. The UV radiation from each source passes through each corresponding rod and into the surrounding resin, which cures the surrounding resin to form a voxel around the rod. The voxels that are cured around multiple rods collectively make up the first layer of the 3D object. Specifically, the layer may include adjacent voxels—which may be formed as a continuous segment of cured resin—and/or individual voxels. When cured, the voxels may adhere to the base plate, and the base plate may be moved upward so that the next layer of voxels may be formed on the lower surface of the first layer.

In particular, the base plate and the adhered layer of cured resin may be moved upwards until the bottom of the cured layer is positioned at the tops of the rods. The control system may then operate the 3D printer to cure one or more voxels to form a subsequent layer (e.g. a second layer) of the 3D structure, which is adhered to the preceding layer above it. The process of lifting a cured layer from the rods and curing subsequent layers may then be repeated for each layer to form the 3D structure below the previously-cured layer.

Another example 3D printer may be configured with a resin-filled container and a base plate. However, in this example embodiment, the rods may extend downwards from the base plate into the resin. Initially, the base plate may be submerged into the resin such that the rods are in contact with the bottom of the container. The control system may cure voxels to form a layer of a 3D object in a similar manner as described above, which, after curing, may be separated from the rods and rests at the bottom of the container within the resin. The base plate may then be lifted upwards until the lower ends of the rods are positioned at the top of the initially cured layer of resin. The process may then be repeated, forming subsequent layers that adhere to the layers beneath it to form the 3D object within the resin.

By providing a two or more of light-emitting rods within the resin, the example 3D printers described above may allow for more rapid formation of 3D objects; e.g., as compared to a process where solid layers. Forming a layer from voxels as described above may require considerably less time compared to traditional methods that cure layers of resin using concentrated light sources. For instance, because the cured voxels are partially hollow, a smaller volume of resin may be required to form each layer, thus allowing for a shorter curing time. In addition, depending on the sizes of the rods, each layer formed may be thick (i.e. tall), allowing for quick formation of large 3D objects. Further, because multiple voxels are formed simultaneously, each layer may be formed in a fraction of the time compared to the time required to direct a concentrated light source along the shape of the layer.

It should be understood that the possible benefits described above and elsewhere herein are not required. Further, other benefits are possible.

II. ILLUSTRATIVE 3D PRINTER SYSTEMS

FIG. 1A shows a 3D printer system 100 according to an example embodiment. The 3D printer system 100 includes a resin container 102 and light sources, such as light source 104, coupled to rods, such as rod 103, which extend from the base of the resin container. The light sources are operable to emit electromagnetic radiation, which passes through the rods and into the resin 105. The radiation may cure a portion of the resin 105 surrounding the rods through which the radiation is passing. Further, the 3D printer system 100 includes a robotic arm 106 having the base plate 108 attached thereto.

The robotic arm 106 may be operable to position the base plate 108 above the resin container 102, and to move the base plate 108 with respect to the resin container 102 with at least one degree of freedom (upwards and downwards). In some implementations, the robotic arm may be able to operate in at least three degrees of freedom to allow for lateral movement of the base plate 108 parallel to the base of the resin container 102, in addition to upwards movement away from resin container 102 and downwards movement towards the resin container 102. In some implementations, the control system may be able to set the orientation of the base plate and/or the translation of the base plate. Other implementations may allow for additional degrees of freedom as well.

Note that a 3D printer system can mount a base plate to various types of robotic devices, and is not limited to robotic arms. For example, the base plate could be mounted to a two-axis head unit, or an articulated robotic arm having four degrees of freedom. Other example robotic devices are also possible.

The base plate 108 may be implemented as an end effector on the robotic arm 106. Other gripping and/or clasping robotic mechanisms may also be implemented to hold one or more of the layers of cured resin and lift them from the resin 105. Further, the robotic arm 106 may be programmable, such that a set of control instructions can be generated to move the robotic arm 106 in a manner that results in a creation of a particular object on the base plate 108.

A base plate 108 may vary in size and/or shape, depending upon the particular embodiment. Further, the base plate 108 may be formed from various materials or combinations of materials, depending upon the particular embodiment. Generally, the surface of the base plate 108 may be formed from any material to which a base layer of resin will adhere when cured. Further, since the base plate holds the object being printed from above, the size, the weight distribution, the shape, and/or the adhesive properties of the base plate's surface that faces the resin container, may be designed so as to provide support for certain loads (e.g., so that the base plate can hold objects up to a certain weight, shape, and/or size).

The resin container 102 may be of various sizes and/or shapes, depending upon the particular embodiment. In some cases, the resin container 102 may be large enough to allow the 3D printing system to form an entire 3D object within the resin 105.

The light sources may be any controllable light source that emits electromagnetic waves from the appropriate region of the electromagnetic spectrum for curing the resin 105. In some embodiments, the light sources may be controllable to emit ultraviolet (UV) light. The brightness of each light source may also be varied individually, either in a continuous analog fashion or using digital techniques, such as pulse-width modulation. When forming a given layer, the intensity of the light passing through each rod may be individually controlled. Note that the "brightness" may refer to the luminous intensity of the light. The light sources may be embedded within the rods, positioned above or below the rods (depending on the particular embodiment), or may be provided from a remote location and directed into the rods using an optical fiber or other waveguide. Some example light sources include light-emitting diodes (LEDs), gas discharge lamps, lasers, or incandescent bulbs covered in a UV filter. Other light sources may also be used.

Note that a light source that is emitting radiation is represented in the figures as a thick arrow pointing outwards from the light source. For example, in FIG. 2A, every light source depicted is emitting light. In FIG. 2B, none of the light sources depicted are emitting radiation. As another example, some of the light sources depicted in FIG. 2C are emitting radiation. While the light emitted is represented as an arrow, light or other electromagnetic radiation emitted from the light sources may not necessarily be directional. In some instances, the radiation is diffused (i.e. the light source "glows") so that it is not directed to any particular location or direction. The radiation diffusion may be achieved by using a wide-angle light source or by coating, sanding, and/or etching the light source itself. Additionally or alternatively, the rod may be etched, sanded, coated, or otherwise configured to diffuse the radiation from the light source. Any combination of finishing processes and/or other diffusion techniques may be performed in order to diffuse radiation emitted by the light source and passing through the rods into the resin surrounding the rods.

Mechanisms or devices may be coupled to the base of the resin container 102 or to the rods themselves to assist in separating cured resin from the rods. For instance, a vibrating mechanism such as a vibration motor may be attached to the resin container or to the rods to shake loose the cured resin from the rods. As another example, cooling elements, such as heat pumps, may be coupled to the rods which, in response to being cooled, causes the rods to thermally contract and separate from the cured resin. Other temperature-changing elements may also be coupled to the rods to heat and/or cool the rods. As yet another example, gas outlets may be positioned around the rods at the base of the container 102 that aid in separating the cured resin from the rods by discharging gas into the resin. In some implementations, the base of the resin container 102 may allow the rods to be rotated in place or to be retracted into the base of the resin container 102. Further, the rods may be at least partially coated in a non-stick coating, such as polytetrafluoroethylene (PTFE) or another low-friction coating or lubricant.

The rods may be made of one or more materials that allow light emitted from the light sources to pass through. The rods may be configured to diffuse the light to evenly distribute light passing through them. In some implementations, the rods may be made of a transparent or translucent material, such as glass or a semi-transparent plastic. The rods may be sanded, etched, coated in a substance, or any combination thereof to diffuse the light passing through them. The rods may be solid or partially hollow. The rods may also be of any size and/or, depending on the particular embodiment.

Figure 1B:
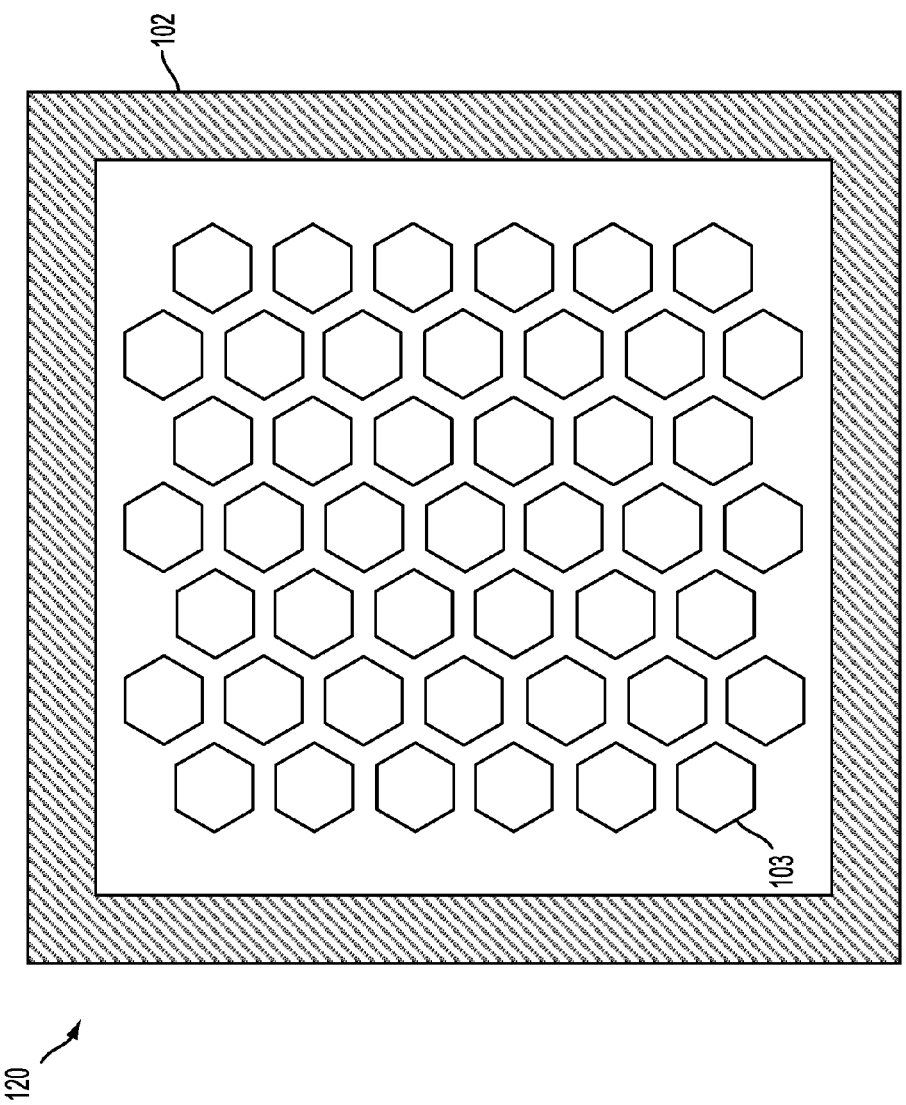
FIG. 1B shows a top-down view of a three-dimensional printer system, according to an example embodiment.

The rods may take on a variety of shapes. FIG. 1B depicts a top-down view 120 of the 3D printer system 100, according to a particular embodiment. In this embodiment, the rods, such as rod 103, are shaped as hexagonal columns. The rods shown in FIG. 1B are arranged as a two-dimensional lattice (more specifically, as a chamfered hexagonal tiling). During operation, radiation passing through a given rod cures the resin in the channel surrounding that rod to form a voxel. Thus, the thickness of the voxels corresponds to the space within the channels surrounding the rods.

Any number of rods may be present within a particular 3D printer system. The rods may be shaped as cylindrical tubes, triangular columns, rectangular prisms, or octagonal columns. Other rod shapes are also possible. The arrangement of the rods may vary depending on the particular rod shape and/or embodiment. For instance, the rods may be arranged as a two-dimensional grid. Other arrangements are also possible. Further, one or more of the rods may be omitted from the lattice or grid, depending upon the particular implementation. Other examples are possible.

The build volume of an example system, such as 3D printer system 100, may be defined at least in part by the range of movement and/or the reach of the robotic device to which the base plate is mounted. For example, in FIG. 1, the build volume may be defined by the range of movement of the robotic arm 106. Other examples are possible.

Further, example embodiments, such as the 3D printer system 100, may allow for the creation of objects that are much larger than those that can be created in a 3D printer where the build volume is defined by the dimensions the pan (e.g., the surface area of resin container 102) and/or by the surface area of the base plate.

In some example embodiments, the robotic arm 106 may be operable to move laterally to offset the position of one or more voxels in a particular layer. FIGS. 2E and 2F, which are discussed in more detail below, depict an example lateral offset between layers.

In another embodiment, the rods may extend downwards from the base plate 108. A 3D printing system according to this embodiment may form voxels in a similar manner as describe above by curing resin surround the rods by passing light emitted from light sources through them. The voxels may then be separated using at least one of the techniques described above. In some cases, the initial layer may adhere to the base of the container or a separate platform placed at the bottom of the container.

In other embodiments, the rods may be position at an angle within a resin container. Alternatively, the rods may be positioned along a side of the resin container 102. Other rod placements may also be possible.

III. OPERATIONS OF AN EXAMPLE 3D PRINTER SYSTEM

FIGS. 2A to 2F illustrate example operations of a 3D printer system, according to an example embodiment. More specifically, FIGS. 2A to 2D illustrate a sequence in which two layers of a 3D object are formed according to an example method, such as method 500. FIGS. 2E and 2F illustrate an example operation involving a lateral offset between formed layers.

Figure 2A:
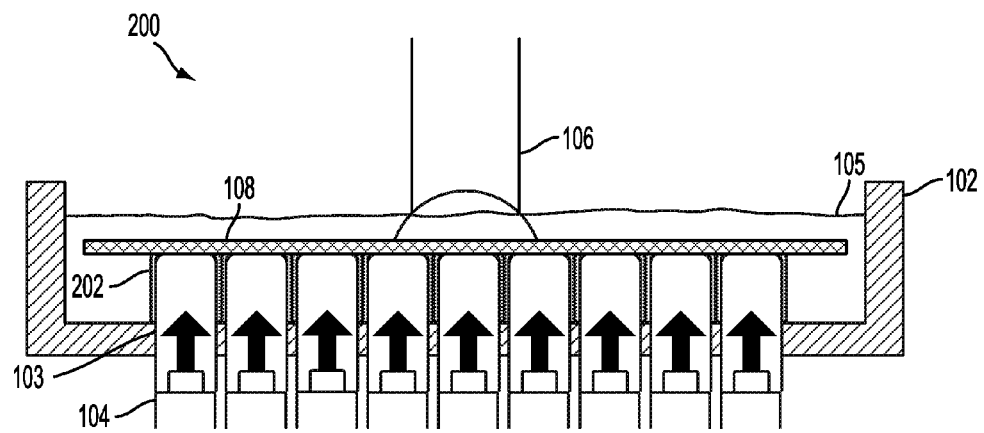
FIGS. 2A to 2F illustrate example operations of a three-dimensional printer system, according to an example embodiment.
Figure 2B:
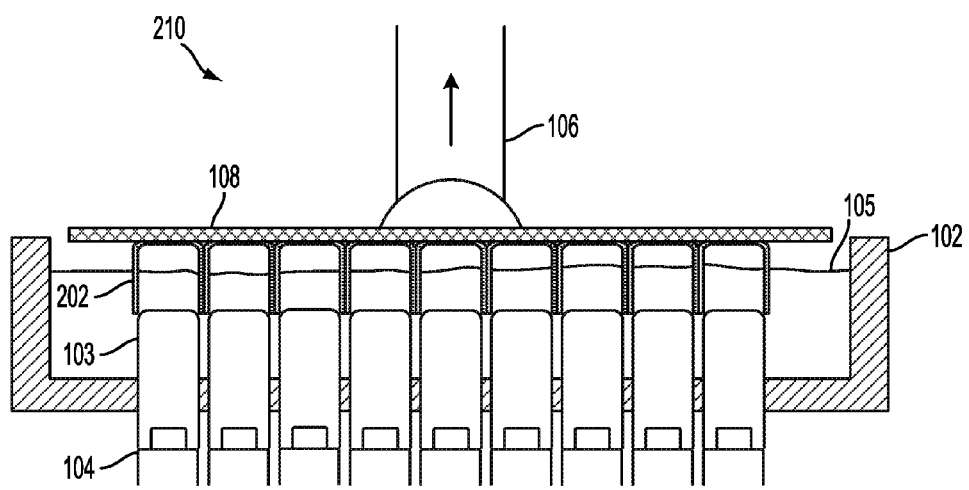
Figure 2C:
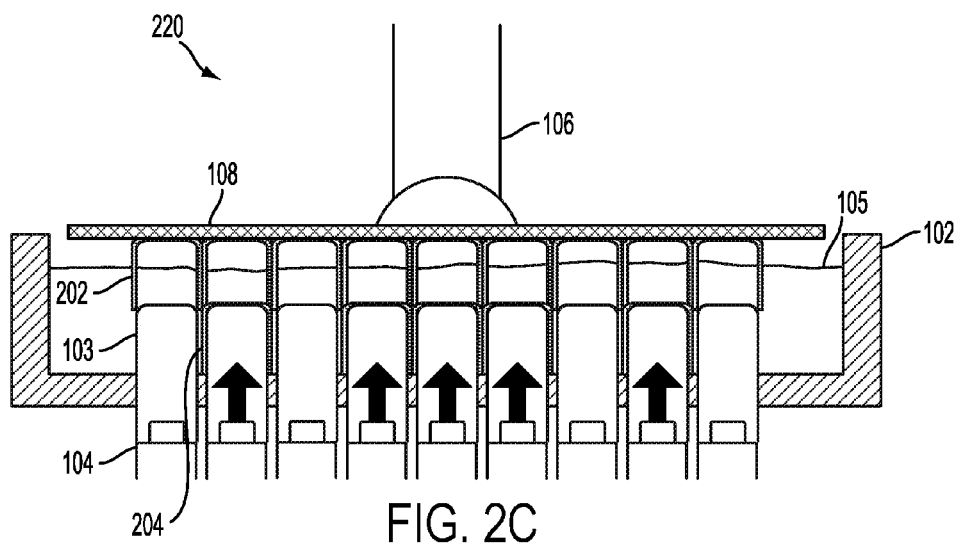

FIG. 2A depicts a 3D printer 200 during a curing operation for an initial layer. The base plate 108 is positioned such that it is in contact with the rods. In the curing operation, each of the light sources can selectively emit radiation that cures resin surrounding each of rods to form voxels. For example, voxel 202 may be cured around rod 103. An additional voxel (not labeled) can be selectively cured around each of the other rods shown in FIG. 2A. Voxel 202 and other voxels that are cured parallel to voxel 202 may collectively form an initial layer, which adheres to the base plate 108.

FIG. 2B depicts the 3D printer 200 during a lifting operation that separates the voxels of the initial layer from the rods. Prior to beginning the lifting operation, the light sources are turned off to prevent undue curing during the lifting operation. As shown in FIG. 2B, the voxels of the initial layer are adhered to the base plate 108, which is lifted upwards, separating the formed voxels from the rods around which they formed. The 3D printer 200 may maneuver the base plate 108 such that the bottom of the initial layer is positioned at the top ends of the rods. In some cases, this distance is predetermined based on a known fixed height of the rods.

FIG. 2C depicts a 3D printer 200 during a curing operation for a subsequent layer. After the lifting operation is completed, some of the light sources are turned on and emit radiation to cure resin, forming subsequent layer. The voxels of the subsequent layer, such as voxel 204, may adhere to voxels of the previously-formed initial layer during the curing operation. Note that, during the curing operation shown in FIG. 2C, the base plate 108 is no longer submerged within the resin 105.

Figure 2D:
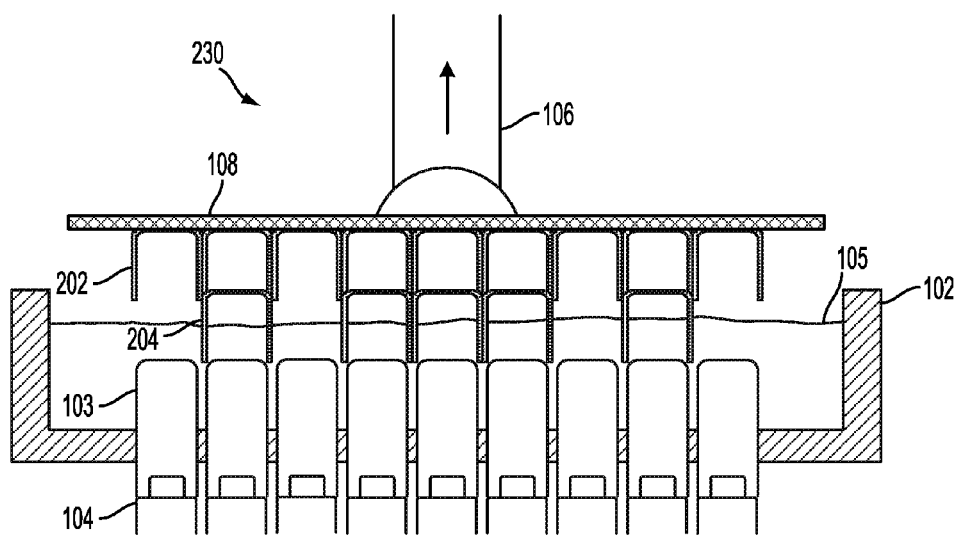
Figure 2E:
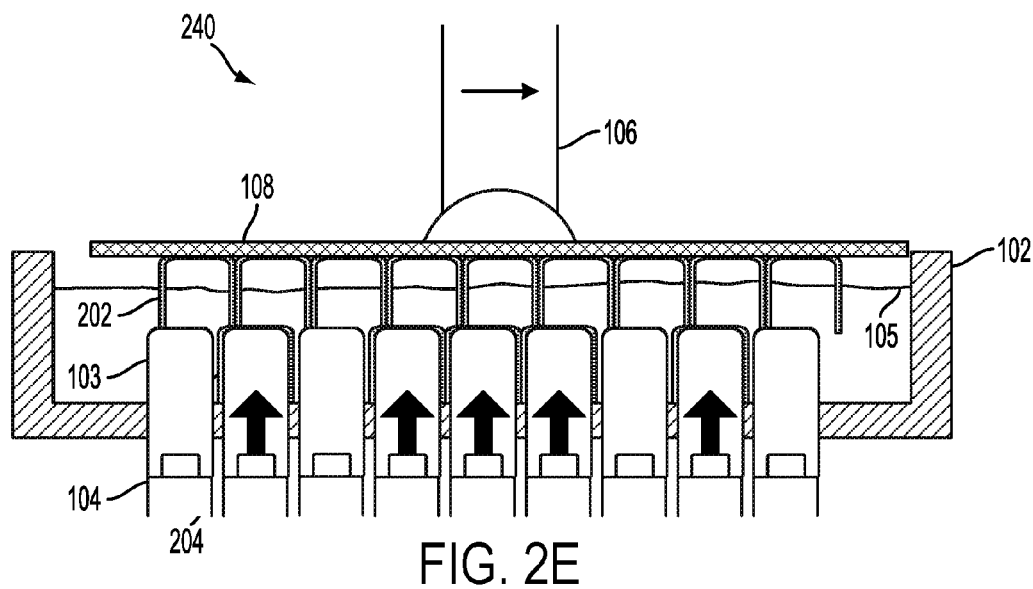
Figure 2F:
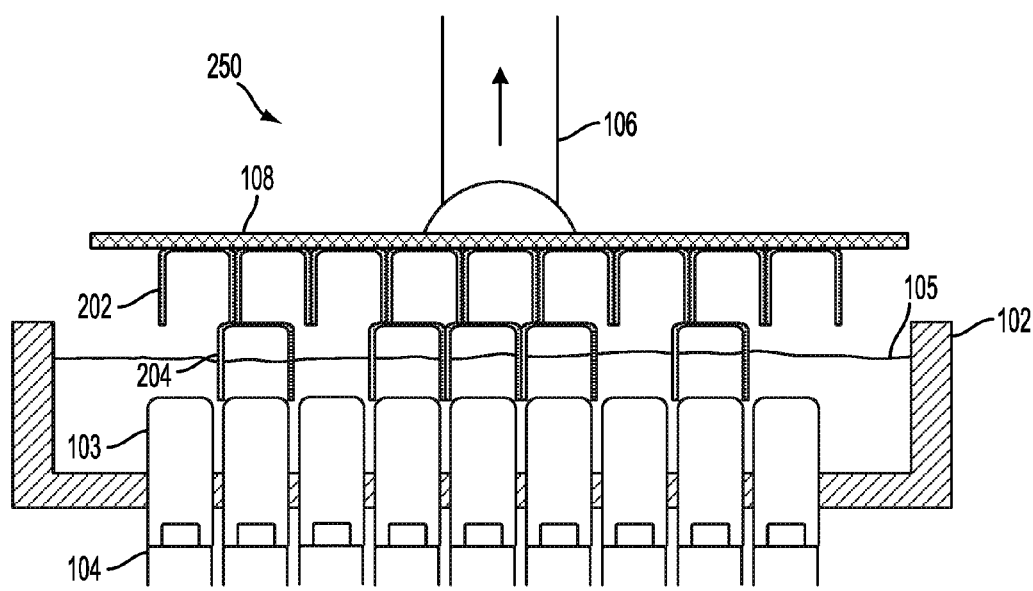
Figure 3A:
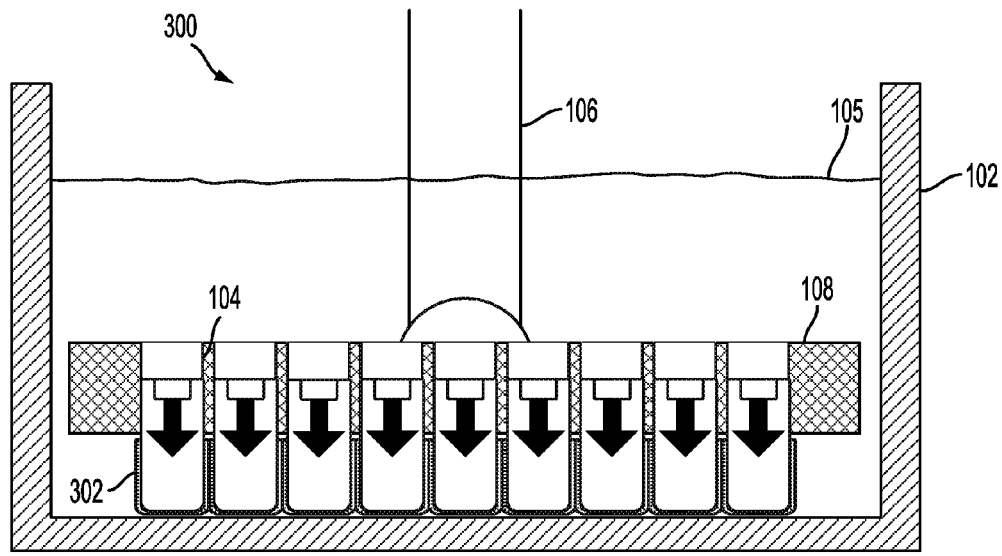
FIGS. 3A to 3D illustrate example operations of a three-dimensional printer system, according to another example embodiment.
Figure 3B:
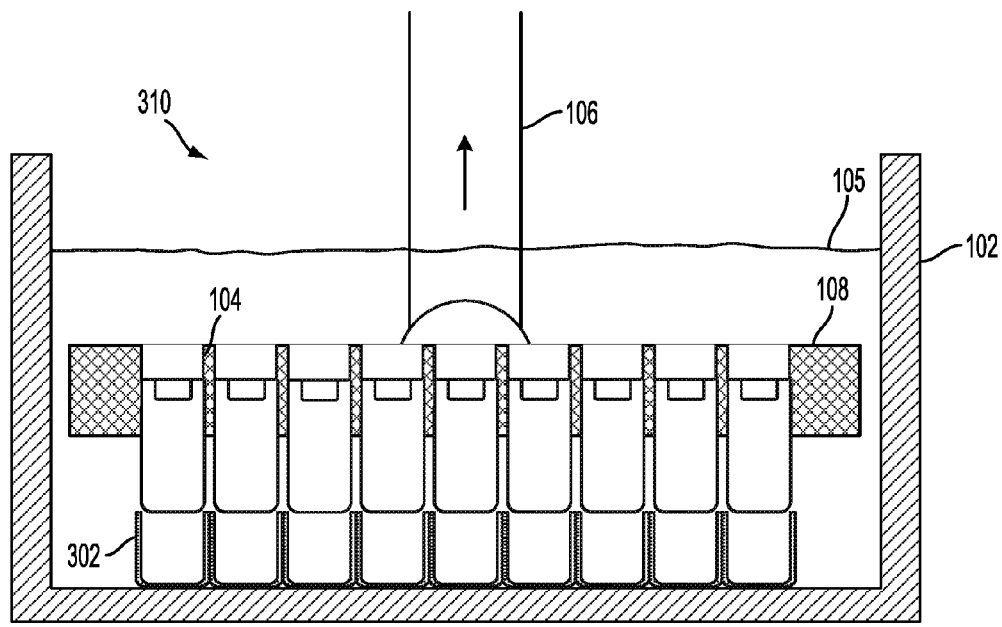
Figure 3C:
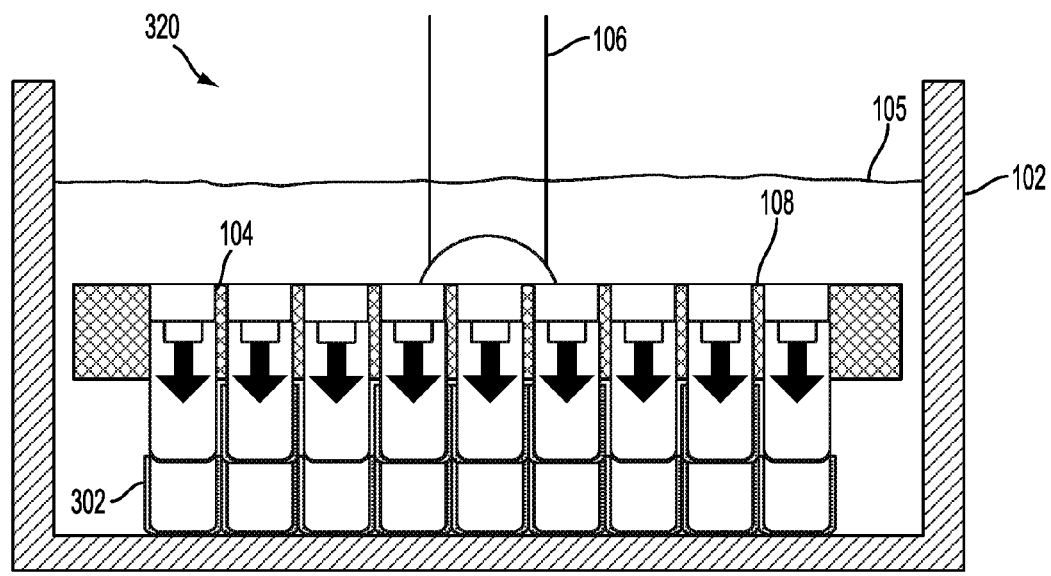
Figure 3D:
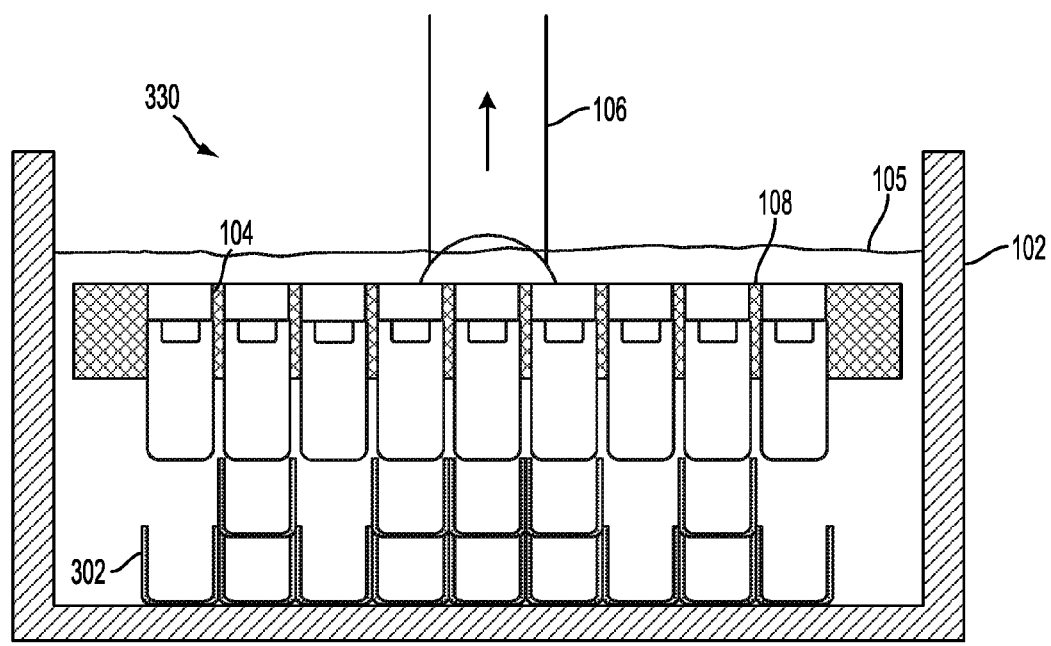

FIG. 2D depicts a 3D printer 200 during a lifting operation that separates the voxels of the subsequent layer from the rods. The lifting operation shown in FIG. 2D is performed similarly to the lifting operation shown in FIG. 2B.

The operations depicted in FIGS. 2A to 2D may be repeated any number of times in order to form any number of layers of voxels.

FIG. 2E depicts a 3D printer 200 during a curing operation for a subsequent layer involving a lateral offset. The curing operation shown in FIG. 2E is similar to the curing operation shown in FIG. 2C, except that prior to operating the light sources, the base plate 108 laterally moves to form an offset between the initial layer and the rods. After the lateral alignment of base plate 108 is completed, the light sources are operated to cure the voxels that form the subsequent layer. As a result of the lateral offset, each voxel in the subsequent layer may adhere to portions of multiple voxels of the initial layer. In this manner, more fine-grained differences (i.e. "sub-voxel" divisions) between layers may be formed.

FIG. 2F depicts a lifting operation 250 that separates the laterally-offset voxels of the subsequent layer from the rods. The lifting operation may be similar to the lifting operations 210 and 230.

The operations of FIGS. 2E and 2F may be repeated, using different amounts of lateral offset for each offset. Note that, while the offset depicted in FIGS. 2E and 2F are shown in one dimension, the lateral offset may be a two-dimensional offset.

The lateral offset operations shown in FIGS. 2E and 2F may be performed multiple times for a particular layer (which may be referred to herein as "multi-phase offset" or "multi-phase alignment") to form offsets within the particular layer. In some cases, the shape of a layer may be more accurately formed if voxel offsets are incorporated within that layer. Inter-layer offsets described herein may allow for a 3D printing system to simulate printing at resolutions that are higher than would otherwise be allowed for with a grid or lattice of rods.

As an example operation, a subset of light sources may initially be operated to cure one or more voxels that represent a portion of the layer's shape. The rods corresponding to the initially-operated light sources may then retract into the base of the resin container, separating the cured voxels from the rods and allowing the base plate to move without breaking off the cured voxels adhered thereto or damaging the rods. Then, the base plate is shifted laterally by a prescribed amount. After positioning the base plate, another subset of light sources may be operated to cure one or more voxels that represent the other portion of the layer's shape. Collectively, the two portions may comprise the layer. The base plate may then be lifted, removing the cured voxels from the rods and completing the formation of the layer. Alternatively, subsequent portions of the same layer may be performed by retracted rods and shifting the base plate as described above.

Other rod arrangements allowing for inter-layer offsets may be possible. For instance, the rods may be controllable to move about within a predefined. As one example, each rod may be individually operated to move along a track, so that a particular spacing between each of rods may be designated for a given layer. Other rod arrangements that allow for inter-layer offsets may also be possible.

Note that the voxels depicted in FIGS. 2A to 2F, as well as those shown in FIGS. 3A to 3D, are shown to have a particular shape and thickness. In other example operations, the shape and thickness of voxels may vary. Additionally, the voxels are shown to include at least 3 sides, forming from resin surrounding the sides and top of the rods. The voxels are shown in this manner for explanatory reasons. In some implementations, radiation may pass through the sides of the rods, but are prevented from being passed through the top end of the rods. In such implementations, the voxels would form around the rods, but not above or below the rods, such that the voxels formed are columns having a hollow center.

FIGS. 3A to 3D illustrate example operations of a 3D printer system, according to another example embodiment. Operations depicted in FIGS. 3A to 3D are similar to operations depicted in FIGS. 2A to 2D, respectively. However, the rods of 3D printer system shown in FIGS. 3A to 3D extend downwards from the base plate into the resin. The 3D printer system shown in FIGS. 3A to 3D may also include various mechanisms and devices as described above. The various techniques that may be used to separate the cured voxels from the rods may also be incorporated onto the base plate 108. Additional overlapping description is omitted; however it should be understood that the operations described above may be applied to this example embodiment.

It should be understood that FIGS. 2A to 2F and FIGS. 3A to 3D are provided for explanatory purposes and are not intended to be limiting. Other 3D printing systems that form voxels are also possible. Further, it should be understood that any combination of components may be arranged in a variety of ways for a particular 3D printing system, and that they may operate the same as or similarly to the operations described with respect to FIGS. 2A to 2F and FIGS. 3A to 3D, without departing from the scope of the invention.

IV. CONTROL OF AN EXAMPLE 3D PRINTER SYSTEM

Referring again to FIG. 1A, a 3D printer system 100 may also include or be communicatively coupled to a control system 110. A control system 110 may take the form of or include executable program logic, which may be provided as part of or in conjunction with a 3D printer system 100. Such program logic may be executable to, e.g., generate control signals for a 3D printer system 100. For example, a number of program-logic modules may be included as part of a control system, such as control system 110.

In an example embodiment, the control system 110 may be operable to (a) receive data specifying a 3D structure, (b) determine a shape for each of a two or more of layers that collectively form the 3D structure, and (c) form each of the two or more of layers by (i) determining one or more of the light sources that correspond to the determined shape of the layer and (ii) operating the one or more determined light sources to cure a layer of liquid resin having the determined shape. The control system 110 may also operate the robotic arm 106, after curing the layer of liquid resin, to move the base plate upwards, such that the bottom surface of the cured layer is positioned at the top ends of the rods. The control system may repeat these operations to cure multiple layers of resin to form the 3D structure in a layer-by-layer manner.

Figure 4:
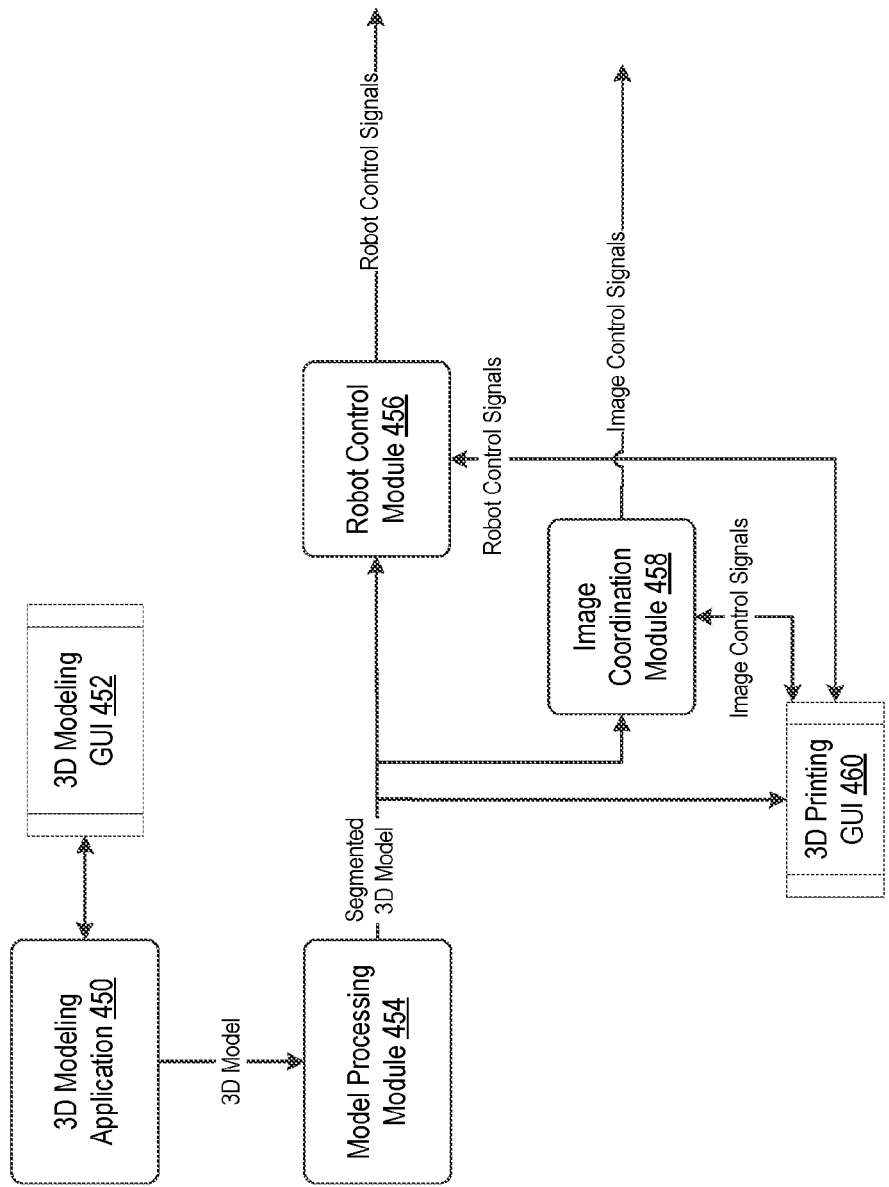
FIG. 4 shows example program logic modules for interfacing with and controlling a three-dimensional printer system.

FIG. 4 shows example program logic modules for interfacing with and controlling a 3D printer system. In particular, a 3D-modeling application 450 and corresponding GUI 452 may allow for 3D model generation. Further, to prepare the 3D model for printing, a model-processing module 454 may apply a slicing process to the 3D model. For example, various techniques may be used to define a set of voxels for the 3D model that represent the solid portions of the 3D model. The each voxel may be associated with a three-dimensional position. Layers of the 3D models may be defined by the voxels that lie within a particular plane (for example, voxels having different width or depth locations, but are at the same height).

In some cases, the 3D model may be represented as continuous lines and/or curves (e.g. vector graphics). The model processing module 454 may rasterize the vector-based 3D model to generate the set of discrete voxels that represents the 3D model at a particular resolution. The resolution may depend from the number of rods in a given 3D printer system.

In other cases, the 3D model may be represented as a discrete set of voxels at a certain resolution that is incompatible with a given 3D printer system. The model processing module 454 may use digital techniques to upscale or downscale the 3D model so that the resolution of the each layer matches the capabilities of the given 3D printer system. Other examples are also possible.

The segmented 3D model may then be passed to both: (i) a robot-control module 456, which may generate robot control signals, and (ii) an image coordination module 458, which may generate image control signals signal for 3D printing, including image files and light-source control signals, in order to print a 3D object based on the 3D model. Further, note that the robot control module 456, the image coordination module 458, and/or other program logic modules may coordinate the timing of the robot control signals with the timing of the image control signals, so that the 3D printing process is properly carried out.

V. ILLUSTRATIVE METHODS

Figure 5:
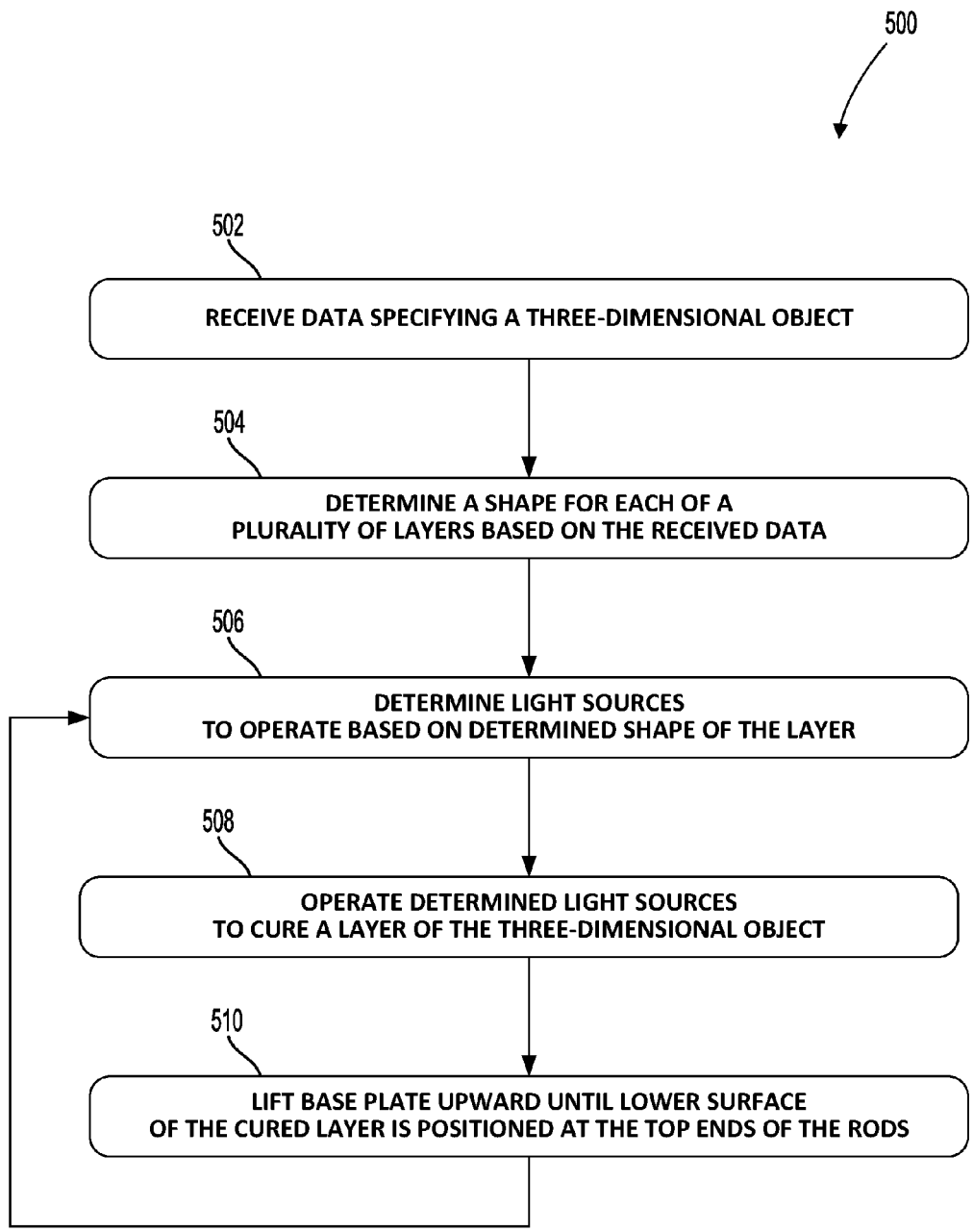
FIG. 5 is a flowchart illustrating a three-dimensional printing method, according to an example embodiment.

FIG. 5 is a flowchart illustrating a 3D printing method 500 according to an example embodiment. Method 500 may be implemented by a 3D printer configured in the same or a similar manner as 3D printer 100 shown in FIG. 1 (e.g., by the control system 110 of 3D printer 100). Of course, it should be understood that method 500 may be implemented by other types of 3D printers and/or by control systems for other types of 3D printers.

As shown by block 502, the method 500 involves receiving data specifying a three-dimensional object. For example, block 502 may involve the control system receiving a file that describes an object for purposes of 3D printing, such as a Standard Tessellation Language (STL) file, an Object (OBJ) file, or a Polygon (PLY) file, among other possibilities. The control system may then determine a sequence of two-dimensional (e.g., cross-sectional) shapes representative of a two or more of layers of the three-dimensional object, as shown by block 504. For instance, at block 504, a software- or firmware-based program may process the 3D model file to generate a sequence of layers and output a file with instructions for the particular 3D printer (e.g., a G-code file).

As shown by block 504, the method 500 involves determining a shape for each of a two or more of layers based at least in part on the received data. The shape of each layer may be represented by a series of voxels representing discrete positions on that layer that make up the 3D object. In some implementations, the layers are represented by bitmaps, where each bit corresponds to a particular light source and indicates whether or not to operate that particular light source, as shown in block 506. The voxels may also include offset information that indicates more precisely the location of the voxel. In some cases, the shape for each layer is represented as vector graphics or is at a resolution higher than the 3D printer system is capable of printing. In these cases, the method 500 involves rasterizing the received data to generate a discrete set of voxel values that represent the 3D object at a resolution compatible with the particular 3D printer system. Then, at block 506, the control system operates the light sources corresponding to the voxel values representing the shape of the layer of the 3D object.

As shown by block 508, the method 500 involves operating the determined light sources to cure a layer of the three-dimensional object. The control system may operate the light source and the base plate (e.g., by controlling the mechanical features to which the base plate is attached) to sequentially form the two or more layers of the three-dimensional object. After forming a given layer, the control system may operate the base plate to lift the cured voxels from the rods, as shown in block 510. The control system may then operate one or more light sources to cure voxels forming the following layer of the 3D object. A portion of the layer may adhere to a portion of the previously-formed layer. The operations of block 506 to 510 may be repeated to form the 3D object layer-by-layer.

Figure 6:
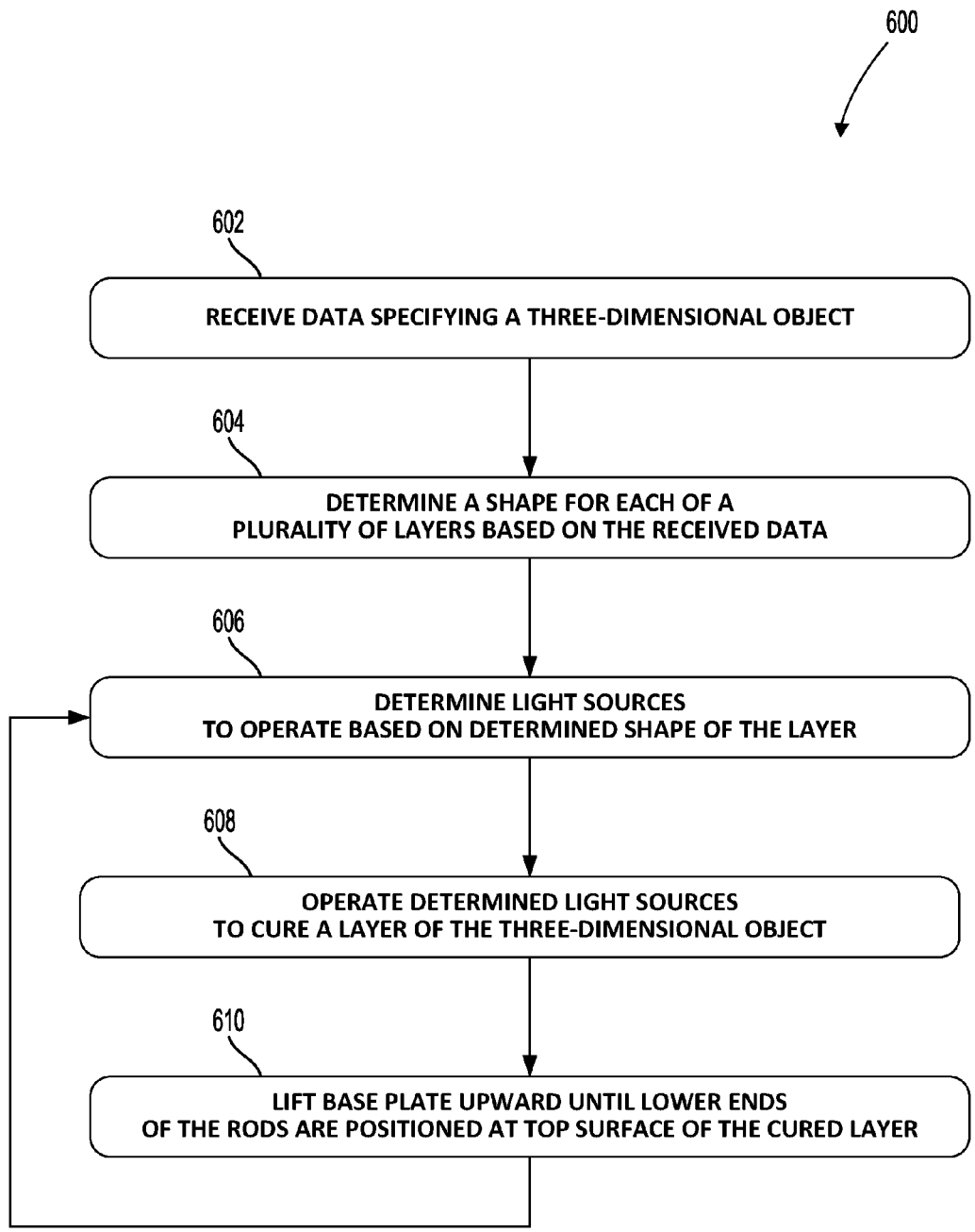
FIG. 6 is a flowchart illustrating a three-dimensional printing method, according to another example embodiment.

FIG. 6 is a flowchart illustrating a 3D printing method 600 according to another example embodiment. Method 600 may be implemented by a 3D printer configured in the same or a similar manner as 3D printer 100 shown in FIG. 1 (e.g., by the control system 110 of 3D printer 100). Of course, it should be understood that method 600 may be implemented by other types of 3D printers and/or by control systems for other types of 3D printers.

Blocks 602 and 604 involve determining the shape of each layer of a 3D object. The operations of 602 and 604 may be the same as or similar to the operations of blocks 502 and 504.

At block 606, the method 600 may involve determining, for a particular layer, light sources to operate in order to form the voxels that comprise the particular layer. The operations of block 606 may be similar to the operations of block 506. In the embodiments associated with method 600, however, the order in which the layers are formed may be reversed.

At block 608, the method 600 involves operating the light sources to cure a particular layer of the 3D object. The operations of block 608 may be same as or similar to the operations of block 508.

At block 610, the method 600 involves lifting the base plate upwards until the lower ends of the rods are position at the top surface of the cured layer. The proximity of the lower ends of the rods to the previously-cured layer may be such that operating the light sources causes the resin to cure against the previously-cured layer and adhere to that layer. The "top surface" of the cured layer referred to in block 610 describes the topmost portion of the cured layer that was formed. It should be understood that a layer may be formed from voxels that are hollow (i.e. shells), and the "surface" described refers the top end of the hollow voxel. In an example operation, if the same light source is operated for two consecutive layers, the vertically-aligned voxels may adhere to each other to form a continuous hollow voxel.

Generally, it should be understood that the voxel printing processes described herein may be applicable, in whole or in part, to other types of 3D printers. Further, those skilled in the art will understand that aspects of the voxel printing processes may be inverted or arranged in a variety of ways. Other examples are possible.

VI. CONCLUSION

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. A computer-implemented method comprising:
   receiving, by a three-dimensional (3D) printer, data specifying a layer of a three-dimensional (3D) structure that is to be printed;
   selecting, by the 3D printer and from among multiple light sources that are each associated with a respective hollow mold of an arrangement of hollow molds that each extend into a resin container, a subset of the light sources that correspond to the layer of the three-dimensional structure; and
   activating, by the 3D printer, the light sources of the selected subset of light sources that correspond to the layer of the three-dimensional structure, thereby causing cured resin to be formed around the hollow molds that are associated with the light sources of the selected subset; and
   lifting, by the 3D printer, the cured resin that is formed around the hollow molds that are associated with the light sources of the selected subset.

2. The method of claim 1, wherein the arrangement of hollow molds extends into the resin container from the bottom of the resin container, and wherein the light sources are positioned beneath the resin container.

3. The method of claim 1, wherein the arrangement of hollow molds extends into the resin container from a moveable base plate that is associated with the 3D printer, and wherein the light sources are positioned within the base plate.

4. The method of claim 1, comprising:
   receiving, by the three-dimensional (3D) printer, data specifying a second layer of the three-dimensional (3D) structure that is to be printed;
   selecting, by the 3D printer and from among the multiple light sources that are each associated with a respective hollow mold of an arrangement of hollow molds that each extend into a resin container, a second subset of the light sources that correspond to the second layer of the three-dimensional structure; and
   activating, by the 3D printer, the light sources of the selected second subset of light sources that correspond to the second layer of the three-dimensional structure, thereby causing cured resin to be formed around the hollow molds that are associated with the light sources of the selected subset, and to adhere to the lifted, cured resin that formed around the hollow molds that were associated with the light sources of the selected subset; and
   lifting, by the 3D printer, the cured resin that formed around the hollow molds that are associated with the light sources of the selected subset, and that adhere to the lifted, cured resin that formed around the hollow molds that were associated with the light sources of the selected subset.

5. The method of claim 1, wherein the subset of the light sources comprises fewer than all of the light sources.

6. The method of claim 1, comprising dynamically adjusting an extent to which the hollow molds of the arrangement extend into the resin container.

7. The method of claim 1, wherein the cured resin is lifted using an articulated robotic arm.

8. The method of claim 1, wherein the arrangement comprises a honeycomb pattern or grid pattern of hollow molds that are spaced apart from each other.

9. A non-transitory computer readable storage medium encoded with a computer program, the program comprising instructions that when executed by data processing apparatus cause the data processing apparatus to perform operations comprising:
   receiving, by a three-dimensional (3D) printer, data specifying a layer of a three-dimensional (3D) structure that is to be printed;
   selecting, by the 3D printer and from among multiple light sources that are each associated with a respective hollow mold of an arrangement of hollow molds that each extend into a resin container, a subset of the light sources that correspond to the layer of the three-dimensional structure; and activating, by the 3D printer, the light sources of the selected subset of light sources that correspond to the layer of the three-dimensional structure, thereby causing cured resin to be formed around the hollow molds that are associated with the light sources of the selected subset; and lifting, by the 3D printer, the cured resin that is formed around the hollow molds that are associated with the light sources of the selected subset.

10. The medium of claim 9, wherein the arrangement of hollow molds extends into the resin container from the bottom of the resin container, and wherein the light sources are positioned beneath the resin container.

11. The medium of claim 9, wherein the arrangement of hollow molds extends into the resin container from a moveable base plate that is associated with the 3D printer, and wherein the light sources are positioned within the base plate.

12. The medium of claim 9, wherein the operations comprise:

receiving, by the three-dimensional (3D) printer, data specifying a second layer of the three-dimensional (3D) structure that is to be printed;

selecting, by the 3D printer and from among the multiple light sources that are each associated with a respective hollow mold of an arrangement of hollow molds that each extend into a resin container, a second subset of the light sources that correspond to the second layer of the three-dimensional structure; and activating, by the 3D printer, the light sources of the selected second subset of light sources that correspond to the second layer of the three-dimensional structure, thereby causing cured resin to be formed around the hollow molds that are associated with the light sources of the selected subset, and to adhere to the lifted, cured resin that formed around the hollow molds that were associated with the light sources of the selected subset; and lifting, by the 3D printer, the cured resin that formed around the hollow molds that are associated with the light sources of the selected subset, and that adhere to the lifted, cured resin that formed around the hollow molds that were associated with the light sources of the selected subset.

13. The medium of claim 9, wherein the subset of the light sources comprises fewer than all of the light sources.

14. The medium of claim 9, wherein the operations comprise dynamically adjusting an extent to which the hollow molds of the arrangement extend into the resin container.

15. The medium of claim 9, wherein the cured resin is lifted using an articulated robotic arm.

16. The medium of claim 9, wherein the arrangement comprises a honeycomb pattern or grid pattern of hollow molds that are spaced apart from each other.

17. A system comprising:

one or more computers and one or more storage devices storing instructions that are operable, when executed by the one or more computers, to cause the one or more computers to perform operations comprising:

receiving, by a three-dimensional (3D) printer, data specifying a layer of a three-dimensional (3D) structure that is to be printed;

selecting, by the 3D printer and from among multiple light sources that are each associated with a respective hollow mold of an arrangement of hollow molds that each extend into a resin container, a subset of the light sources that correspond to the layer of the three-dimensional structure; and activating, by the 3D printer, the light sources of the selected subset of light sources that correspond to the layer of the three-dimensional structure, thereby causing cured resin to be formed around the hollow molds that are associated with the light sources of the selected subset; and lifting, by the 3D printer, the cured resin that is formed around the hollow molds that are associated with the light sources of the selected subset.

18. The system of claim 17, wherein the arrangement of hollow molds extends into the resin container from the bottom of the resin container, and wherein the light sources are positioned beneath the resin container.

19. The system of claim 17, wherein the arrangement of hollow molds extends into the resin container from a moveable base plate that is associated with the 3D printer, and wherein the light sources are positioned within the base plate.

20. The system of claim 17, wherein the operations comprise:

receiving, by the three-dimensional (3D) printer, data specifying a second layer of the three-dimensional (3D) structure that is to be printed;

selecting, by the 3D printer and from among the multiple light sources that are each associated with a respective hollow mold of an arrangement of hollow molds that each extend into a resin container, a second subset of the light sources that correspond to the second layer of the three-dimensional structure; and activating, by the 3D printer, the light sources of the selected second subset of light sources that correspond to the second layer of the three-dimensional structure, thereby causing cured resin to be formed around the hollow molds that are associated with the light sources of the selected subset, and to adhere to the lifted, cured resin that formed around the hollow molds that were associated with the light sources of the selected subset; and lifting, by the 3D printer, the cured resin that formed around the hollow molds that are associated with the light sources of the selected subset, and that adhere to the lifted, cured resin that formed around the hollow molds that were associated with the light sources of the selected subset.

* * * * *